United States Patent [19]

Selesnick

[11] Patent Number: 5,116,515
[45] Date of Patent: May 26, 1992

[54] PROCESS AND APPARATUS FOR REMOVING VOLATILE ORGANIC COMPOUNDS FROM CONTAMINATED VADOSE SOIL AREAS

[75] Inventor: Lawrence B. Selesnick, Fort Lauderdale, Fla.

[73] Assignee: Soil Guardian Inc., Trenton, N.J.

[21] Appl. No.: 690,473

[22] Filed: Apr. 24, 1991

[51] Int. Cl.$^5$ .............. B01D 3/42; B01D 17/035; E21B 43/34

[52] U.S. Cl. .................. 210/744; 55/18; 55/55; 55/164; 166/267; 210/110; 210/138; 210/170; 210/188; 210/259; 210/747; 210/806; 210/919

[58] Field of Search .............. 55/55, 97, 98, 164, 55/165, 167-170, 18, 160; 166/265, 266, 267, 370, 53; 175/57; 210/85, 96.1, 104, 110, 138, 139, 143, 170, 188, 218, 220, 258, 259, 263, 747, 804, 806, 807, 901, 744, 919

[56] References Cited

U.S. PATENT DOCUMENTS

| | | | |
|---|---|---|---|
| 2,884,132 | 4/1959 | Kangas | 210/108 |
| 3,274,101 | 9/1966 | West et al. | 55/1 |
| 3,547,190 | 12/1970 | Wilkerson | 55/73 |
| 3,934,650 | 1/1976 | LaFortune | 166/267 |
| 4,149,597 | 4/1979 | Redford | 166/272 |
| 4,167,973 | 9/1979 | Forte et al. | 210/170 |
| 4,300,860 | 11/1981 | Yan | 405/263 |
| 4,423,634 | 1/1984 | Audenard et al. | 73/587 |
| 4,536,293 | 8/1985 | Babineaux | 210/717 |
| 4,563,283 | 1/1986 | Nicksic | 210/696 |
| 4,593,760 | 6/1986 | Visser et al. | 166/370 |
| 4,600,508 | 7/1986 | Deghetto | 210/170 |
| 4,660,639 | 4/1987 | Visser et al. | 166/267 |
| 4,730,672 | 3/1988 | Payne | 166/267 |
| 4,832,122 | 5/1989 | Corey et al. | 166/266 |
| 4,886,119 | 12/1989 | Bernhardt et al. | 166/267 |
| 4,890,673 | 1/1990 | Payne | 166/266 |
| 4,892,664 | 1/1990 | Miller | 166/267 |
| 4,945,988 | 8/1990 | Payne et al. | 166/266 |
| 4,966,654 | 10/1990 | Carberry | 210/747 |
| 4,982,788 | 1/1991 | Donnelly | 166/370 |
| 5,050,676 | 9/1991 | Hess et al. | 166/267 |
| 5,076,360 | 12/1991 | Morrow | 166/370 |

*Primary Examiner*—Robert A. Dawson
*Assistant Examiner*—Joseph Drodge
*Attorney, Agent, or Firm*—Sperry, Zoda & Kane

[57] ABSTRACT

A process and apparatus is disclosed for removing volatile organic contaminants from vadose soil areas. Air is drawn through recovery probes positioned in the soil area being monitored. At intervals a blower is activated to draw gaseous vapors from the contaminated soil area above the underground water level. These gases are gathered within a water separator tank where gases and accidentally gathered liquids are separated. The gases are then passed through a filtration device for cleaning thereof. The device includes a water purifying system for dry cleaning contact water known to be contaminated. An external reservoir is provided for receiving of the contact water and for movement of the contact water into the water separator tank as desired. The level of water within the tank is constantly monitored. An aspiration means may be activated within the water separator tank to bubble through the contaminated liquid for stripping organic contaminants therefrom. Flow of fluid into the tank and activation of the aspiration means.

21 Claims, 2 Drawing Sheets

PROCESS AND APPARATUS FOR REMOVING VOLATILE ORGANIC COMPOUNDS FROM CONTAMINATED VADOSE SOIL AREAS

BACKGROUND OF THE INVENTIONS

1. Field Of The Invention

The present invention deals with the field of devices for de-contaminating the vadose soil layer. The figure of the present invention is applicable to the field of inventions having probes extending downwardly into the earth in contaminated soil areas to a level above the underground water table to remove contaminated gases therefrom. The contamination in these gases normally includes volatile organic compounds such as perchlorethylene and others.

The present invention is designed to be permanently installed at a specific location adjacent to a source of contamination such as a dry cleaning station wherein the soil is constantly monitored and de-contaminated and cycled on and off as desired.

2. Description Of The Prior Art

There are numerous devices utilized for cleaning of vadose soil layers such as U.S. Pat. No. 2,884,132 patented Apr. 28, 1959 to C. H. Kangas on an Automatic Filter Backwash System; U.S. Pat. No. 3,274,101 patented Sep. 20, 1966 to R. C. West et al on a Solvent Recovery Process; U.S. Pat. No. 3,547,190 patented Dec. 15, 1970 to L. Wilkerson on an Apparatus For Treating Waste Water Associated With Hydrocarbon Production; U.S. Pat. No. 3,934,650 patented Jan. 27, 1976 to R. LaFortune on Recovery Of Natural Gas During Solution Mining Of An Underground Salt Deposit; U.S. Pat. No. 4,149,597 patented Apr. 17, 1979 To D. Redford on a Method For Generating Steam; U.S. Pat. No. 4,167,973 patented Sep. 18, 1979 to E. Forte et al on a Process For Chemical Decontamination of Layers Of Earth And/Or Water Contaminated With Organic Materials; U.S. Pat. No. 4,300,860 patented Nov. 17, 1981 to T. Yan on a Method Of Treating A Subterranean Formation To Remove Ammonium Ions; U.S. Pat. No. 4,423,634 patented Jan. 3, 1984 to B Audenard et al on a Device For The Activation Of An Apparatus For Measuring Acoustic Emission By Detection Of Background Noise; U.S. Pat. No. 4,536,293 patented Aug. 20, 1985 to D. Babineaux on a Method Of Treating Waste Water; U.S. Pat. No. 4,563,283 patented Jan. 7, 1986 to S. Nicksic on a Process For Clarifying Bicarbonate Bearing Waters Using Measurement And Control Of Carbon Dioxide Content; U.S. Pat. No. 4,593,760 patented Jun. 10, 1986 to M. Visser et al on Removal Of Volatile Contaminants From The Vadose Zone Of Contaminated Ground; U.S. Pat. No. 4,660,639 patented Apr. 28, 1987 to M. Visser et al on Removal Of Volatile Contaminants From The Vadose Zone Of Contaminated Ground; U.S. Pat. No. 4,730,672 patented Mar. 15, 1988 to F. Payne on a Method Of Removing And Controlling Volatile Contaminants From The Vadose Layer Of Contaminated Earth; U.S. Pat. No. 4,832,122 patented May 23, 1989 to J. Corey et al on an In-Situ Remediation System And Method For Contaminated Groundwater; U.S. Pat. No. 4,886,119 patented Dec. 12, 1989 to B. Bernhardt on a Method Of And Arrangements For Driving Volatile Impurities From Ground; U.S. Pat. No. 4,890,673 patented Jan. 2, 1990 to F. Payne on a Method Of Removing Volatile Contaminants From Contaminated Earth Strata and U.S. Pat. No. 4,892,664 patented Jan. 9, 1990 on Decontamination Of Sites Where Organic Compound Contaminants Endanger The Water Supply.

SUMMARY OF THE INVENTION

The present invention includes an apparatus for removing volatile organic compounds from contaminated vadose soil areas which include one or more recovery probes positioned extending downwardly into the vadose contaminated soil area immediately above the underground water level to facilitate removal of volatile organic compounds.

The recovery probe may include a cylindrical configuration to define a recovery probe chamber internally therein adapted to receive gases received from adjacent contaminated soil areas. These cylindrical recovery probes preferably include slots therein defined preferably extending in the horizontal direction therearound to facilitate entry of gases from the contaminated soil into the recovery probe chamber.

A pre-filter preferably of coarse sand material can be positioned extending around the recovery probe adjacent the horizontal slots defined therein. This coarse sand acts as a pre-filter and also facilitates maintaining of the slots open rather than closed or clogged. A gas flow line will then extend between each recovery probe to establish fluid flow communication thereof with respect to a water separator tank positioned remotely therefrom.

The water separator tank is designed to receive fluid through the gas flow line from the recovery probes in such a manner as to separate any liquid and gas as desired. Under normal operating conditions liquid will not be drawn through the recovery probe due to the low vacuum utilized for drawing of gases therefrom. However periodically gathering of liquid may be possible and therefore the water separator is designed to separate these liquids from the gas gathered.

A liquid level sensing device is positioned within the water separator tank and is operable to monitor the liquid level therein. Once the liquid level achieves a predetermined level noted as the filled condition or level the liquid level sensing means is apt to so indicated. A drain may be positioned within the water separator tank to facilitate draining thereof as desired as movable between a closed position preventing fluid flow therethrough and an open position allowing water to be removed from the water separator tank after cleansing thereof.

An inlet valve may be positioned adjacent the gas flow line to selectively control flow therethrough into the water separator tank. The inlet valve is adapted to be closed responsive to the liquid level sensing means noting a full water condition within the water separator tank to thereby prevent excessive water levels or accumulation within the water separator tank.

To facilitate cleaning of the contaminated water gathered within the water separator tank an aeration means such as a bubbler may be positioned within the water separator tank in the lower portion thereof. This bubbler is adapted to introduce gaseous bubbles into the water gathered within the water separator tank to remove volatile organic compounds therefrom and introduce them into the gases above the water level within the water recovery tank. The aeration device is adapted to render operative normally for a predetermined period of time responsive to the liquid level sensing device noting a full water condition within the water separator tank.

A blower is positioned in fluid flow communication with respect to the water separator tank and is adapted to pull gases therefrom to form a partial vacuum therein to facilitate drawing of gases from the recovery probe chambers through the gas flow line into the water separator tank. The blower is operable at low vacuum in order to maximize gases drawn into the water separator and to minimize liquid drawn therein. Preferably the blower means will be operated to create a vacuum of not greater than 4.2 inches of mercury.

A filtration device such as an activated carbon adsorption filter can be positioned in fluid flow communication with respect to the blower to receive gases therefrom. The filtration means is adapted to remove volatile organic compounds therefrom. The filtration device includes an outlet to exhaust cleaned air into the ambient environment.

An external reservoir may be included for gathering contaminated water externally from the recovery probe. That is, contaminated water is often present in this environment separate and distinct from contamination found in the soil area. This water is often described as "contact water" which includes a significant amount of volatile organic compounds therein. This contact water is significantly produced at dry cleaning locations. The present invention provides a means for decontaminating this liquid simultaneously with de-contaminating the surrounding soil area. The external reservoir is designed to accumulate this contaminated contact water as desired. An external water introduction device is operatively connected with respect to the water separator to facilitate introduction of contaminated water from the water reservoir into the water separator as desired. A vent means may be positioned within the water separator tank to facilitate venting thereof to the ambient environment when desired. A timer or controller may be operatively connected with respect to the blower means to control operation thereof. This timing means can also be operatively connected with respect to the inlet valve as well as the recovery tank drain and the liquid level switch and the external water introduction means. This controller or timer can operatively control operation of each of these system components.

The contaminant monitor is operable to sense contamination in the gases passing toward the filtration means to indicate the level of contamination therein. The contaminant monitor is operative to indicate whether any contamination exists.

In operation the process of the present invention includes cycling on and off of the blower device of the present invention by the timing controller. This on/off cycling minimizes channeling of the vadose soil layer adjacent the recovery probes. The blower is operated at a low vacuum level in order to draw contaminated gases through the recovery probes into the water recovery tank during time periods of operation of the blower. In normal operation any liquid mistakenly drawn through the inlet line will be separated within the water separator tank from the contaminated gases and the contaminated gases will pass therefrom through the blower and into the filtration means for de-contamination thereof. The filtration means will then expel the de-contaminated air into the ambient environment.

Periodically it will be necessary to clean the water gathered within the water separator tank. For this purpose the inlet valve is positioned in the input line extending between the water separator tank and the recovery probes. Normally the timing controller will close the inlet valve and initiate operation of the aeration means within the water recovery tank to remove the volatile organic contaminants in the liquid and move them into the gases confined within the recovery tank. Once the water is de-contaminated the drain can be opened and the water will be drained therefrom. At that point the input solenoid can be opened and readied for the next time period of initiation of operation of the system blower at which time the gases within the recovery tank can be cleaned by passing through the carbon adsorption filtration means.

An external tank can also be included for gathering of contaminated contact water which often results from processing activities which tend to cause contamination of volatile organic compounds such as dry cleaning operations. This contact water can be gathered within the external reservoir means and can be separately admitted into the water separator tank through an external water introduction means as desired. The water separator tank 28 will treat this liquid as having been received through the gas flow line means and will initiate a cleansing operation thereof as described above including the operation of the aeration means.

It is an object of the present invention to provide a processing apparatus for removing volatile organic compounds from contaminated vadose soil areas wherein volatile organic compound contaminants can be removed from vadose soil areas before they can move downwardly into the ground water itself.

It is an object of the present invention to provide a processing apparatus for removing volatile organic compounds from contaminated vadose soil areas wherein clean up costs is minimized.

It is an object of the present invention to provide a processing apparatus for removing volatile organic compounds from contaminated vadose soil areas wherein system maintenance is minimal.

It is an object of the present invention to provide a processing apparatus for removing volatile organic compounds from contaminated vadose soil areas wherein initial capital outlay for equipment is greater lessened.

It is an object of the present invention to provide a processing apparatus for removing volatile organic compounds from contaminated vadose soil areas wherein perchlorethylene and other perk-type vapors which have penetrated concrete into the vadose soil area can be cleaned.

It is an object of the present invention to provide a processing apparatus for removing volatile organic compounds from contaminated vadose soil areas wherein contaminants from conventional dry cleaning operations can be quickly gathered and disposed.

It is an object of the present invention to provide a processing apparatus for removing volatile organic compounds from contaminated vadose soil areas wherein the need for expensive engineers to run and maintain a system are minimized.

It is an object of the present invention to provide a processing apparatus for removing volatile organic compounds from contaminated vadose soil areas wherein low volume is utilized to minimize the gathering of liquid from the vadose soil area.

It is an object of the present invention to provide a processing apparatus for removing volatile organic compounds from contaminated vadose soil areas wherein channeling is prevented by cycling of the blower means on and off during times of operation.

It is an object of the present invention to provide a processing apparatus for removing volatile organic compounds from contaminated vadose soil areas wherein the interval extraction program can be modified based on soil types to maximize removal of contaminants from vadose ground areas.

It is an object of the present invention to provide a processing apparatus for removing volatile organic compounds from contaminated vadose soil areas wherein testing procedures can be minimized since monitoring and testing is built into the de-contamination unit.

It is an object of the present invention to provide a processing apparatus for removing volatile organic compounds from contaminated vadose soil areas wherein monitoring means is included to indicate a leakage problem such that the operator can attempt to minimize the leakage rather than merely treating of the contaminated soil.

It is an object of the present invention to provide a processing apparatus for removing volatile organic compounds from contaminated vadose soil areas wherein air is aspirated through the strategically placed filters into regenerative carbon adsorption units which area normally already positioned serving a dry cleaning involvement.

It is an object of the present invention to provide a processing apparatus for removing volatile organic compounds from contaminated vadose soil areas wherein a blower can be operated at a relatively low speed of less than 200 cubic feet per minute to thereby achieve the desired low vacuum condition.

It is an object of the present invention to provide a processing apparatus for removing volatile organic compounds from contaminated vadose soil areas wherein as many as three individual recovery probe filtration devices can be positioned in an environment to clean radially outward therefrom as far as 10 to 20 feet.

It is an object of the present invention to provide a processing apparatus for removing volatile organic compounds from contaminated vadose soil areas wherein a means is included for sensing of water gathered within the water separator tank to indicate an alarm and shut the system down and initiate treating of the contaminated drain water.

It is an object of the present invention to provide a processing apparatus for removing volatile organic compounds from contaminated vadose soil areas wherein cycling times of operation of the filtration device can be varied depending on the type of soil in which the recovery probes are positioned.

It is an object of the present invention to provide a processing apparatus for removing volatile organic compounds from contaminated vadose soil areas wherein only one hour of operation of the device can achieve the removal of 99% of the contaminants from removed gases and/or contact water.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
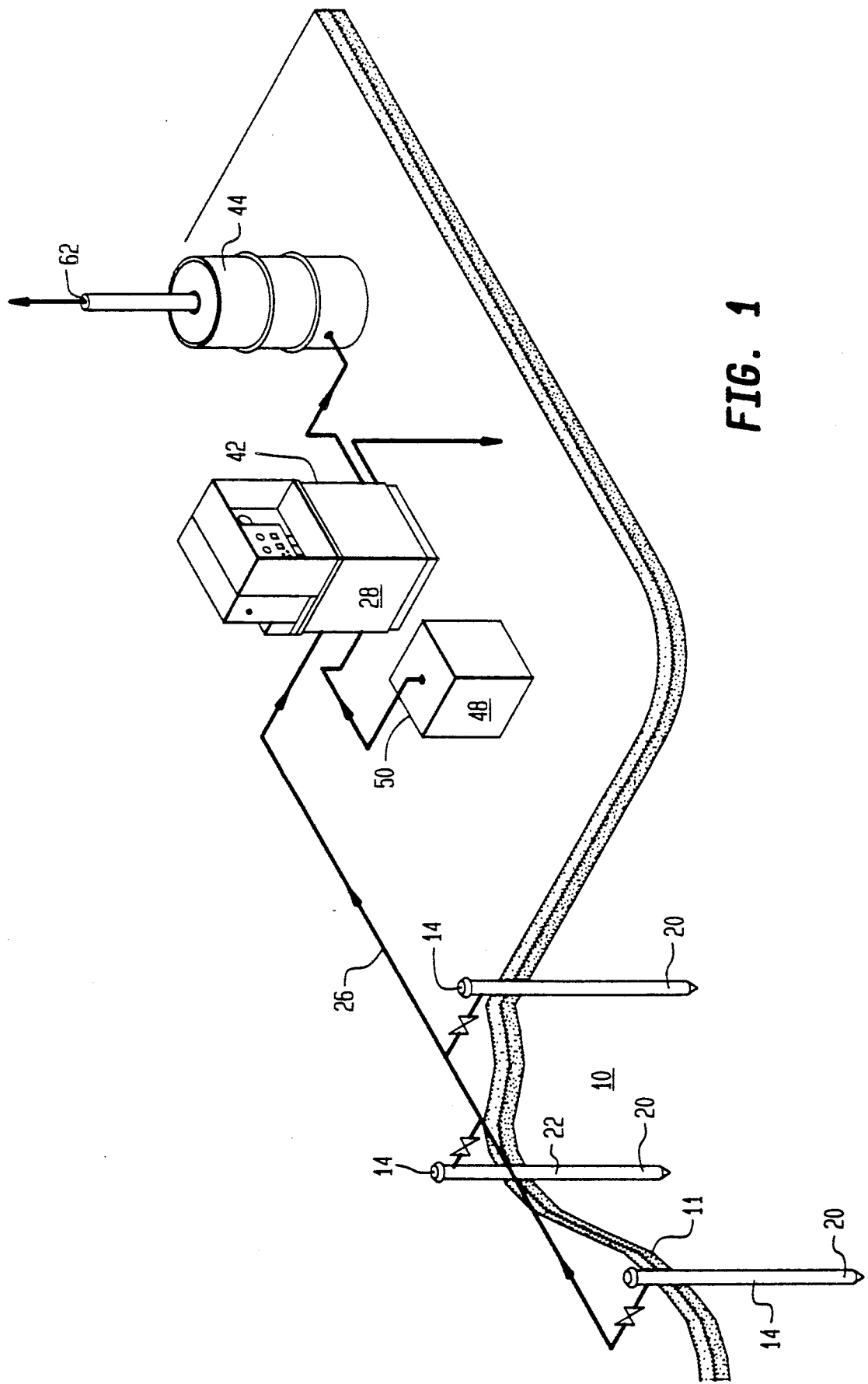
FIG. 1 is a perspective illustration of an embodiment of the apparatus of the present invention performing an embodiment of the process.

The present invention is operable for the removal of contaminated organic compounds such as perchlorethylene from the vadose layer 10 of a soil area 11. The purpose of the present invention is to remove these contaminants from the vadose area 10 before the contaminants can reach further downwardly into the underground water level 12.

To achieve the recovery of these contaminants one or more recovery probes 14 are strategically positioned extending into the vadose layer 10. Each recovery probe is capable of de-contaminating soil at a radius of approximately 5 to 30 feet extending radially outwardly therefrom. This contaminated soil area 16 preferably will be de-contaminated to an extent such that the underground water level 12 will not become contaminated.

These installations are particularly useful for placement permanently at locations where contamination by volatile organic compounds can be expected. Such locations would include dry cleaning processing stations wherein the use of volatile organic compounds is extensive.

By the placement of several of the individual recovery probes 14 about the permanent location below the cement floor level thereof a constant monitoring and constant de-contamination of the vadose layer therebelow can be achieved. This is generally desirable and can be often required under Federal environmental protection regulations.

The recovery probe 14 defines a recovery probe chamber 18 defined within the cylindrical member 22 thereof. The cylindrical outer wall 22 preferably defines one or more slots 20 which may extend horizontally therearound to facilitate the movement of volatile organic contaminants from the vadose layer 10 into the recovery probe chamber 18. The movement of these gases is achieved by the application of a partial vacuum to the recovery probe chamber 18 by the blower means 42.

The recovery probes 14 are initially placed by digging of a hole in the soil level 11 extending downwardly to a point above the underground water level or table 12. The recovery probe 14 is placed therein and a coarse sand material is backfilled therearound to act as a prefilter means 24 to facilitate maintaining of the slot 20 opened and unclogged.

The underground water table 12 will certainly vary over time in a given area due to higher water levels during the wet seasons and lower water positions during the dry season. The probes of the present invention will normally be placed just above the highest anticipated water table level in a given area to minimize water gathered by the probes. If closer fine tuning of contaminant recovery is desired then the probes can be positioned further downwardly during dryer seasons only.

A gas flow line 26 is preferably connected with respect to the one or more recovery probes 14 and is adapted to draw gases therefrom. Gas flow line 26 extends into the water separator tank 28 which is adapted to receive contaminated fluids drawn from the soil 11 by the recovery probes 14 and carried thereto by the gas flow line 26. The fluid so gathered will usually be contaminated gas 30 however under certain operating conditions it will be difficult to avoid also drawing of some liquid therefrom. As such the liquid will be gathered at a liquid level 32 in the lower portion of the water separator tank 28. It is the purpose of the water separator tank 28 to separate all liquid contaminants 32 from the gaseous contaminants 30 therein.

The water separator tank 28 will include a liquid level sensing device 34 positioned therein for sensing how high the liquid level is and for indicating when a filled condition has been reached. The water separator tank 28 may also include a drain means 36 to facilitate draining of the liquid therefrom after de-contamination thereof.

Movement of fluids through the gas flow line 26 can be halted by the positioning of an inlet valve 38 between the gas flow line 26 and the inlet 58 of the water separator tank 28. During certain de-contamination operations it is necessary to eliminate the inward flow of contaminated fluid through the gas flow line 26 and this is achieved by closing of the inlet valve 38 when desired.

Figure 2:
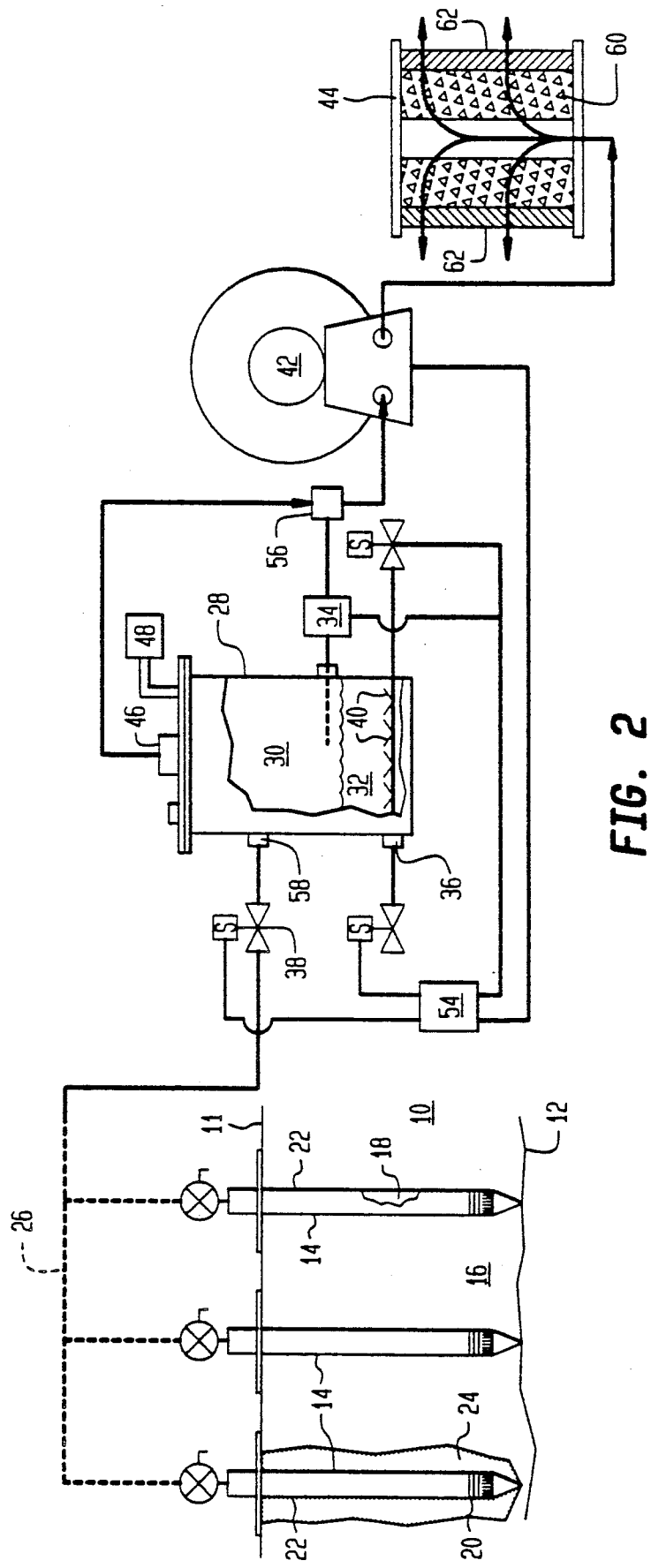
FIG. 2 is a schematic illustration of an embodiment of the apparatus of the present invention.

The contaminated gases drawn into the water separator tank 28 will be urged to move by the blower means 42 to the filtration 44 which preferably can comprise a carbon activated filtration canister for removing the volatile organic compounds from the gases. The filtration means 44 preferably includes a gas exit 62 for expelling clean gases into the external ambient environment. The activated carbon 60 within the filtration means 44 can be best shown in FIG. 2.

The water separator tank may also include a vent means 52 to facilitate operation of the drain 36 and prevent formation of a vacuum within the water separator tank during draining thereof. Furthermore a contaminant monitoring means 56 may be positioned adjacent the water separator tank 28 to indicate the level of contamination of gases exiting therefrom.

In operation of systems near dry cleaning stations a significant amount of contact water or contaminated liquid is generated which also needs to be decontaminated. For this reason the present invention includes an external reservoir 48 positioned adjacent the water separator tank 28.

Reservoir 48 is adapted to receive contaminated contact water by placement therein manually or by other more automatic means. This additional contaminated water will not be gathered through the recovery probes. It will come directly from operating equipment normally associated with dry cleaning operations. This additional water often called "contact water" will tend to be contaminated with the same contaminants as the liquid and gases gathered through the recovery probes and thus can be similarly processed for decontamination by the apparatus of the present invention. An external water introduction means 50 is adapted to move the contaminated liquid from the external reservoir 48 into the water separator tank 28 such that it can be de-contaminated. The system and process for de-contaminating of the liquid inadvertently drawn upwardly through the recovery probes 14 will treat the liquid gathered within the water separator tank 28 resulting from the external water and production means 50 as if that water had been drawn upwardly through the recovery probes 14. As such a single contaminated liquid treatment means will be capable of treating all water regardless of whether the source thereof is the recovery probes 14 or the external reservoir 48 which holds contact water therein.

A timing and controller means 54 is preferably operatively connected with respect to the inlet valve 38 and the drain means 36 to control operation thereof. Controller 54 is also connected with respect to the liquid level sensing means 34 and the contamination monitoring means 56 as well as the aeration means 40.

Timing controller or timing means 54 is operative to monitor conditions and processes within the water separator tank 28. In particular once the water level 32 within the tank 28 is sensed the liquid level sensing means 34 to be at a filled condition the controller 54 will close the inlet valve means 38 and initiate operation of the aeration means 40. The aeration means 40 will bubble air through the contaminated liquid 32 until almost all of the volatile organic compounds are stripped therefrom and moved from the liquid portion 32 to the gaseous portion 30 within the water separator tank 28 and urged toward carbon filtration means 44. Once the liquid has been so decontaminated the controller 54 will cause opening of the drain means 36 thereby draining the de-contaminated liquid therefrom. At that time the inlet valve 38 will be moved to the opened position again allowing the introduction of contaminants recovered through recovery probes 14. The controller 54 will also close the drain and again initiate monitoring of the liquid level 30 within the water separator tank 28.

With this configuration the apparatus of the present invention provides a novel means for treating both contact water and contaminated vadose layer gases simultaneously by the same equipment and process.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. An apparatus for removing volatile organic compounds from contaminated vadose soil areas comprising:
    a) at least one recovery probe means positioned for extending downwardly into contaminated soil areas to facilitate removal of volatile organic compounds therefrom, said recovery probe means defining a recovery probe chamber therein to receive gases received from adjacent contaminated soil areas, said recovery probe means including slot means defined therein to facilitate receiving of gases from contaminated soil into said recovery probe chamber means;
    b) a gas flow line means in fluid flow communication with respect to said recovery probe means to receive gases gathered therein;
    c) a water separator tank means in fluid flow communication with respect to said gas flow line means to receive fluids therefrom and to separate therefrom any liquid passing through said gas flow line means;
    d) a liquid level sensing means positioned within said water separator tank means and operable to sense the liquid level within said water separator tank means;

e) a drain means positioned within said water separator tank means to facilitate draining thereof and being movable between a closed position preventing fluid flow therethrough and an opened position allowing water to be removed from said water separator tank means;

f) an inlet valve means positioned within said gas flow line means to selectively control flow therethrough into said water separator tank means;

g) an aeration means positioned within said water separator tank means to introduce gaseous bubbles into liquid gathered within said water separator tank means to remove volatile organic contaminants therefrom for introduction into gases above the liquid level therein;

h) a blower means in fluid flow communication with respect to said water separator tank means and adapted to pull gases therefrom to form a partial vacuum therein to facilitate drawing of gases from said recovery probe chambers through said gas flow line means into said water separator tank means;

i) a filtration means in fluid flow communication with respect to said blower means to receive gases therefrom, said filtration means being adapted to remove volatile organic contaminants therefrom;

j) an external reservoir means for receiving contaminated water separately with respect to said recovery probe means; and k) an external water introduction means operatively connected with respect to said water separator tank means to facilitate introduction of contaminated water from said external reservoir means into said water separator tank means.

2. An apparatus for removing volatile organic compounds from contaminated vadose soil areas as defined in claim 1 wherein said filtration means comprises an activated carbon filter means.

3. An apparatus for removing volatile organic compounds from contaminated vadose soil areas as defined in claim 1 wherein said filtration means comprises an activated carbon adsorption filtration means.

4. An apparatus for removing volatile organic compounds from contaminated vadose soil areas as defined in claim 1 further comprising a vent means positioned within said water separator tank means to facilitate venting of said water separator tank means.

5. An apparatus for removing volatile organic compounds from contaminated vadose soil areas as defined in claim 1 wherein said filtration means defines an outlet means to exhaust cleaned air into the ambient environment.

6. An apparatus for removing volatile organic compounds from contaminated vadose soil areas as defined in claim 1 wherein said recovery probe means is generally cylindrical to define said recovery probe chamber therein.

7. An apparatus for removing volatile organic compounds from contaminated vadose soil areas as defined in claim 6 wherein said slot means defined in said cylindrical recovery probe means extend horizontally therearound to facilitate gas flow to said recovery probe chamber.

8. An apparatus for removing volatile organic compounds from contaminated vadose soil areas as defined in claim 1 wherein said recovery probe means are arranged to extend downwardly into vadose soil area above a given underground water table.

9. An apparatus for removing volatile organic compounds from contaminated vadose soil areas as defined in claim 1 wherein said blower means is adapted to exert a partial vacuum of approximately 0.5 to 6.0 inches of mercury.

10. An apparatus for removing volatile organic compounds from contaminated vadose soil areas as defined in claim 1 further comprising a pre-filter of coarse sand surrounding each of said recovery probe means adjacent said slot means defined therein.

11. An apparatus for removing volatile organic compounds from contaminated vadose soil areas as defined in claim 1 wherein said blower means is variably operable to facilitate gases being drawn into said water separator tank means and to limit liquid drawn therein.

12. An apparatus for removing volatile organic compounds from contaminated vadose solid areas as defined in claim 1 further comprising a timing means to periodically activate and de-activate said blower means.

13. An apparatus for removing volatile organic compounds from contaminated vadose soil areas as defined in claim 1 further including a contaminant monitor means operable to sense the amount of contamination in the gases downstream of said water separator tank means and indicate same.

14. An apparatus for removing volatile organic compounds from contaminated vadose soil areas as defined in claim 1 wherein said inlet valve means is adapted to prevent liquid flow into said water separator tank means responsive to said liquid level sensing means sensing a full liquid condition within said water separator tank means to prevent excessive liquid levels within said water separator tank means.

15. An apparatus for removing volatile organic compounds from contaminated vadose soil areas as defined in claim 14 wherein said aeration means is adapted to be rendered operative for a predetermined period of time after said liquid level sensing means senses a full liquid condition within said water separator tank means.

16. An apparatus for removing volatile organic compounds from contaminated vadose soil areas as defined in claim 15 including a contaminant monitor means operable to sense contamination levels in the gases being received by said filtration means.

17. An apparatus for removing volatile organic compounds from contaminated vadose soil areas comprising:

a) at least one recovery probe means positioned for extending downwardly into vadose contaminated soil immediately above a given underground water table to facilitate removal of volatile organic compounds therefrom, said recovery probe means including cylindrical member defining a recovery probe chamber therein to receive gases received from adjacent contaminated soil areas, said cylindrical recovery probe means including slot means defined by extending horizontally therearound to facilitate receiving of gases from contaminated soil into said recovery probe chamber means;

b) a pre-filter means of coarse sand positioned around said recovery probe means adjacent said horizontal slot means defined therein;

c) a gas flow line means in fluid flow communication with respect to said recovery probe means to receive gases gathered therein;

d) a water separator tank means in fluid flow communication with respect to said gas flow line means to receive fluids therefrom and to separate therefrom any liquid passing through said gas flow line means;

e) a liquid level sensing means positioned within said water separator tank means and operable to sense the liquid level within said water separator tank means;

f) a drain means positioned within said water separator tank means to facilitate draining thereof and being movable between a closed position preventing fluid flow therethrough and an opened position allowing water to be removed from said water separator tank means;

g) an inlet valve means positioned within said gas flow line means to selectively control flow therethrough into said water separator tank means; said inlet valve means being adapted to be closed responsive to said liquid level sensing means sensing a full liquid condition within said water separator tank means to prevent excessive water levels within said water separator tank means;

h) an aeration means positioned within said water separator tank means to introduce gaseous bubbles into liquid gathered within said water separator tank means to remove volatile organic contaminants therefrom for introduction into gases above the liquid level therein, said aeration means being adapted to be rendered operative for a predetermined period of time responsive to said liquid level sensing means sensing a full liquid condition within said water separator means;

i) a blower means in fluid flow communication with respect to said water separator tank means and adapted to pull gases therefrom to form a partial vacuum therein to facilitate drawing of gases from said recovery probe chambers through said gas flow line means into said water separator tank means, said blower means being variably operable to facilitate drawing of gases into said water separator and to limit liquid drawn therein;

j) a filtration means including an activated carbon adsorption filtration means in fluid flow communication with respect o said blower means to receive gases therefrom said filtration means being adapted to remove volatile organic contaminants therefrom said filtration means defining an outlet means to exhaust cleaned air into the ambient environment;

k) an external reservoir means for receiving contaminated water separately with respect to said recovery probe means;

l) an external water introduction means operatively connected with respect to said water separator means to facilitate introduction of contaminated water from said external reservoir means into said water separator means;

m) a vent means positioned within said water separator tank means to facilitate venting thereof during operation of said drain means;

n) a timing means operatively connected with respect to said blower means to control periodic operation thereof; and o) a contaminant monitor means operable to sense contamination levels in the gases being pulled from said water separator tank means and indicate same.

18. A process for removing volatile organic compounds from contaminated vadose soil areas comprising:

a) establishing at least one bore hole extending downwardly into the vadose layer of soil above a given underground water table;

b) positioning of a recovery probe device within each at least one bore hole to facilitate removal of underground gases therefrom;

c) backfilling with a sand material around each recovery probe device to facilitate entry of underground gases therein;

d) operatively connecting fluid flow lines with respect to each recovery probe device to facilitate drawing of gases therefrom;

e) operatively connecting the fluid flow lines with respect to a water separator tank which receives gases from the respective recovery probe devices; filtering of gases received from within the water separator tank to remove volatile organic contaminants therefrom;

f) periodically applying a vacuum to the water separator tank to draw gases upwardly from the at least one bore hole into the recovery probe devices and through the fluid flow lines to the water separator tank and for filtering thereof;

g) accumulating water drawn through the fluid flow liens within the water separator tank and separating thereof from the gases drawn;

h) using sensing means to detect a full liquid condition within the water separator tank and then halting fluid flow through the fluid flow liens;

i) aerating of the liquid within the water separator tank responsive to the sensing means sensing the full liquid condition with the water separator tank;

j) monitoring the level of contamination in the gases exiting from the water separator tank; and draining of the water from the water separator tank after the level of contamination monitored therein falls below a predetermined level.

19. A process for removing volatile organic compounds from contaminated vadose soil areas as defined in claim 18 wherein said applying a vacuum to the water separator tank is done at approximately 0.5 to 6.0 inches of mercury.

20. A process for removing volatile organic compounds from contaminated vadose soil areas as defined in claim 18 wherein said filtering includes filtration by activated carbon adsorption.

21. A process for removing volatile organic compounds from contaminated vadose soil areas as defined in claim 18 further including adding of contaminated dry cleaning contact water to the water separator tank.

* * * * *

UNITED STATES PATENT AND TRADEMARK OFFICE
CERTIFICATE OF CORRECTION

PATENT NO. : 5,116,515
DATED : May 26, 1992
INVENTOR(S) : Lawrence B. Selesnick

It is certified that error appears in the above-identified patent and that said Letters Patent are hereby corrected as shown below:

In column 10, line 17, change "solid" to -- soil --.

In column 12, line 34, change "liens" to -- lines --.

In column 12, line 38, change "liens" to -- lines --.

Signed and Sealed this

Fifth Day of October, 1993

Attest:

BRUCE LEHMAN

Attesting Officer

Commissioner of Patents and Trademarks